Nov. 4, 1969   J. W. BRACKEN, JR., ET AL   3,476,173
ROTARY REGENERATOR MATRIX MOUNT AND DRIVE
Filed Aug. 16, 1967   2 Sheets-Sheet 1
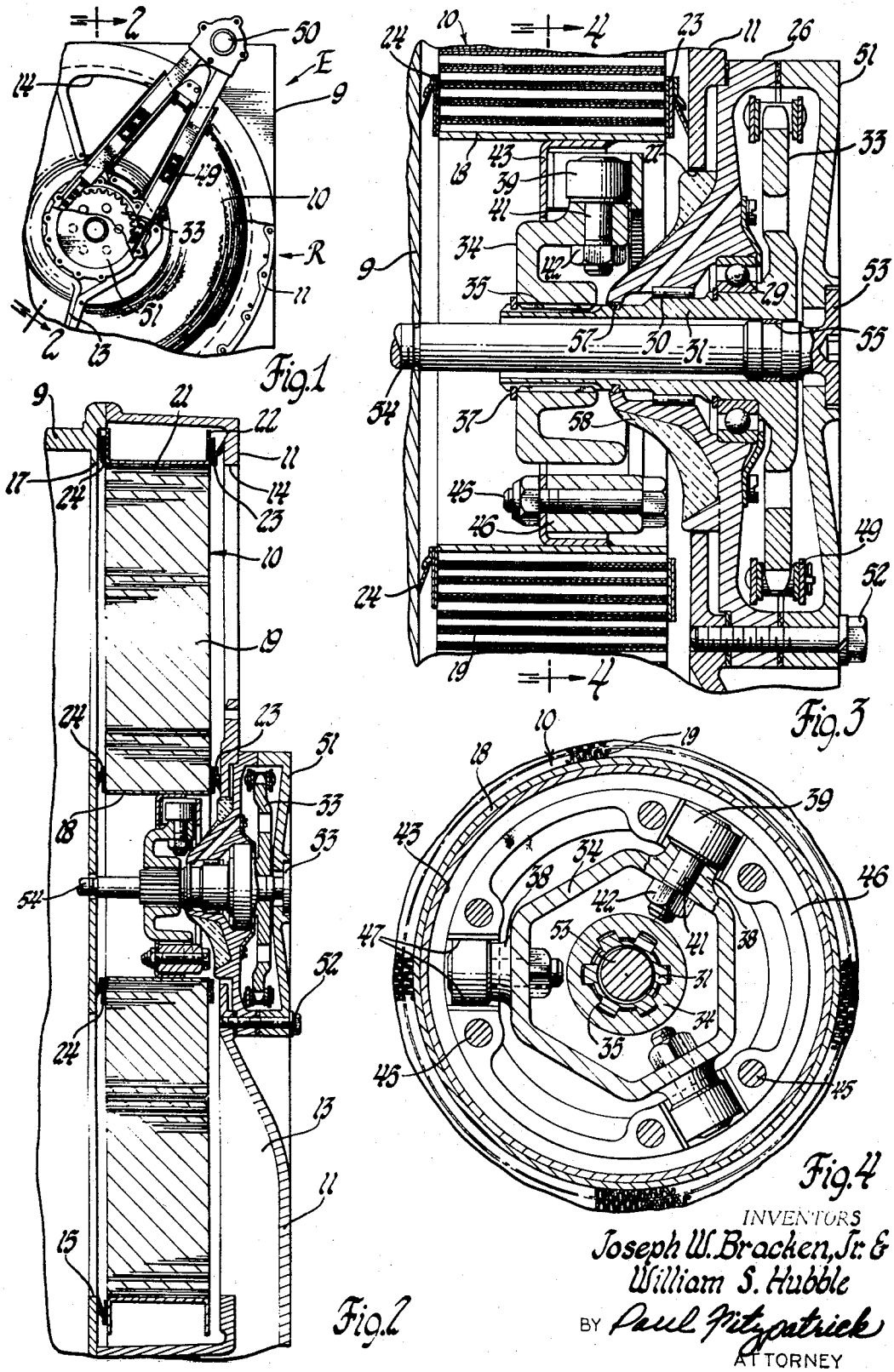
INVENTORS
Joseph W. Bracken, Jr. &
William S. Hubble
BY Paul Fitzpatrick
ATTORNEY

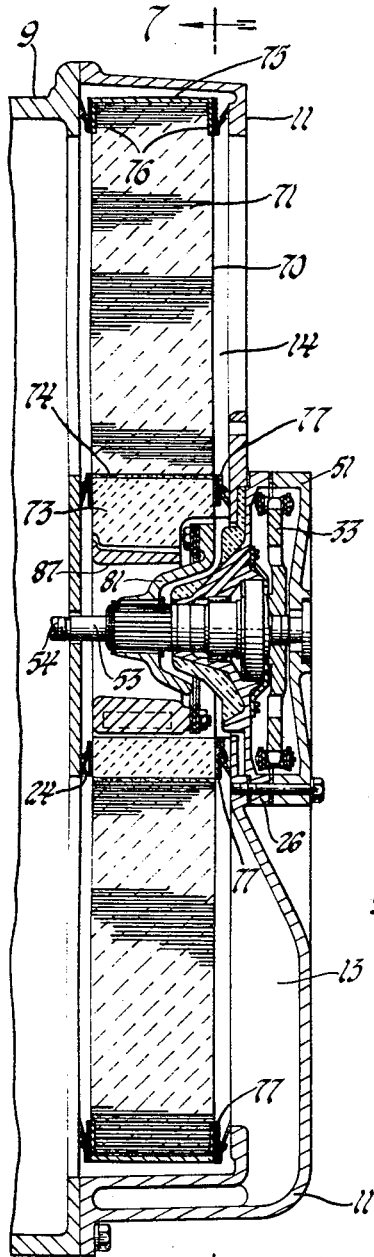
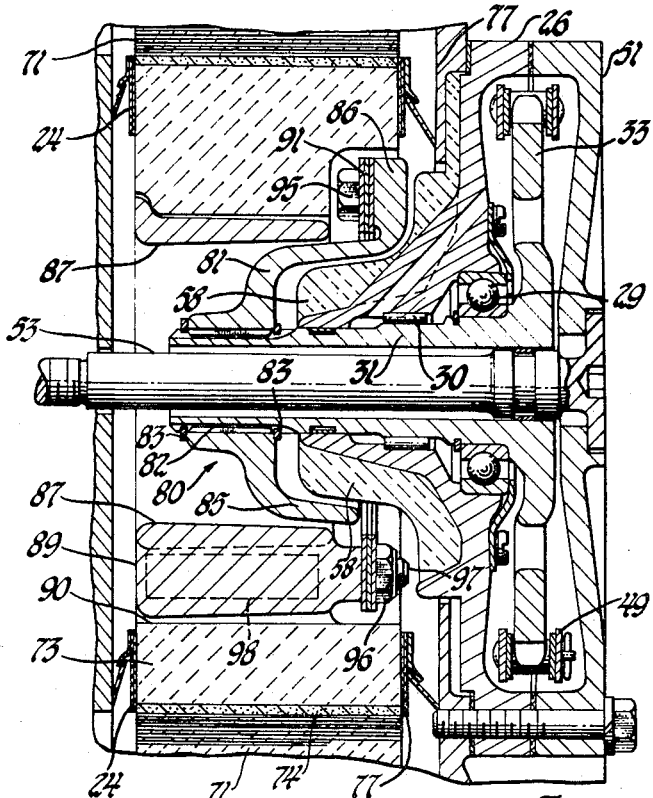
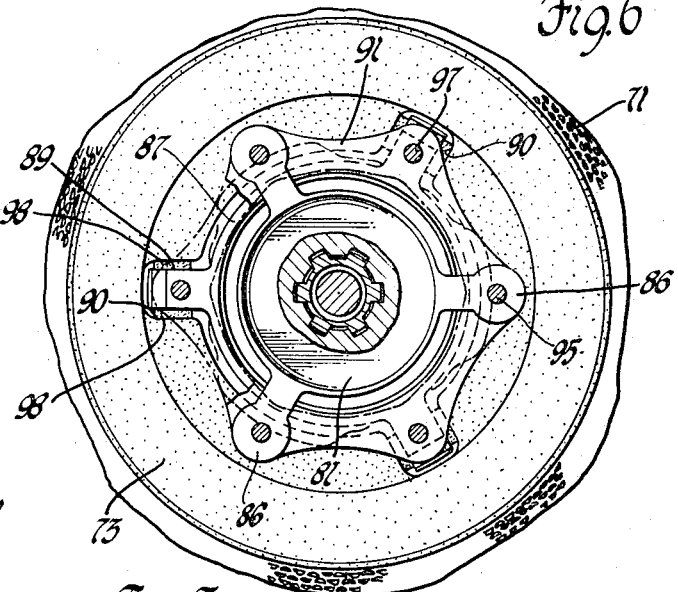
Fig. 5
Fig. 6
Fig. 7
INVENTORS
Joseph W. Bracken, Jr. &
William S. Hubble
BY Paul Fitzpatrick
ATTORNEY United States Patent Office 3,476,173
Patented Nov. 4, 1969

3,476,173
ROTARY REGENERATOR MATRIX MOUNT AND DRIVE
Joseph W. Bracken, Jr., Redford Township, and William S. Hubble, Livonia, Mich., assignors to General Motors Corporation, Detroit, Mich., a corporation of Delaware
Filed Aug. 16, 1967, Ser. No. 661,075
Int. Cl. F23l *15/02;* F28d *19/04;* F16d *3/76*
U.S. Cl. 165—9                                            2 Claims

ABSTRACT OF THE DISCLOSURE

In a rotary regenerator of the axial-flow type the matrix disk is located axially by seals which are connected to the regenerator case. It is centered radially by a central drive shaft connected to the matrix by a universal joint and a radial and axial slip connection to allow for dishing and other distortion of the matrix and for relative expansion of the matrix and the driving member. The matrix may be steel or ceramic; in the latter case, the driving force is spread over an extended surface area of the matrix hub to reduce unit loading.

---

Our invention relates to rotary regenerators and particularly to matrix supporting and driving arrangements for an axial-flow regenerator.

It is well known that the matrices of rotary regenerators expand with temperature and may exhibit considerable distortion in operation because of differential thermal expansion resulting from the substantial differences in temperature between the faces of the matrix. There may also be significant distortion caused by pressures exerted on the matrix.

It is highly important to provide effective sealing to minimize leakage between the two flow paths through the matrix and also important to minimize by-passing of the matrix. The seals should operate with a minimum of friction to reduce wear and mechanical energy loss. Thus, it is desirable that the matrix not exert any significant loads on the seals because of matrix distortion.

So far as the matrix is concerned, the distortion problem is worst with matrices of the usual steel construction. This distortion may be largely avoided by use of a ceramic matrix which has a very low coefficient of thermal expansion. There are still problems of alignment caused by distortion or warping of the fixed structure with which the matrix cooperates. Also, in the case of a ceramic matrix, it is desirable to avoid high unit loads in the coupling of the driving device to the matrix, since there may otherwise be chipping and failure of the matrix.

Our invention is directed to providing support and driving means for a matrix, especially a disk matrix, in which the matrix is allowed to adopt its own optimum position with respect to the seals and is coupled to a central driving shaft through means providing in effect a universal joint and an axial slip connection, and allowing relative radial expansion, so that the shaft locates the matrix only radially and does not constrain it so far as the orientation of the matrix hub or the axial movement or expansion of the hub are concerned.

The principal objects of our invention are to provide a superior rotary regenerator, to provide a regenerator drive adapted to minimize transmission of shocks or concentrated driving loads to a matrix, to provide a simple and structurally sound coupling between a driving means and a matrix, and to provide a matrix drive allowing the matrix to conform to the seals.

We are aware that a matrix center drive has been proposed as, for example, that shown by Chute U.S. Patent No. 2,953,901 issued Sept. 27, 1960.

The nature of our invention and the advantages thereof will be clear to those skilled in the art from the succeeding detailed description of preferred embodiments of the invention and the accompanying drawings thereof.

FIGURE 1 is a small scale drawing illustrating a regenerator installation for a gas turbine engine, with parts cut away.

FIGURE 2 is a larger scale sectional elevation view, taken on the planes indicated by the line 2—2 in FIGURE 1, of a steel matrix regenerator.

FIGURE 3 is a further enlarged section of the central portion of the matrix and the drive therefor, taken on a plane containing the matrix axis.

FIGURE 4 is a cross section taken on the plane indicated by the line 4—4 in FIGURE 3.

FIGURE 5 is a view similar to that of FIGURE 2 illustrating a ceramic matrix installation.

FIGURE 6 is an enlarged partial sectional view of the ceramic matrix installation taken on a plane containing the matrix axis.

FIGURE 7 is a partial cross section taken on the plane indicated by the line 7—7 in FIGURE 5.

Referring first to FIGURE 1, a gas turbine engine E may include an engine block or housing 9 which supports the rotating parts and combustion chamber of a gas turbine engine (not illustrated) and which also supports a rotary regenerator R including an axial-flow matrix 10. The matrix is mounted for rotation about a horizontal axis, as illustrated, at a side face of the block 9. Referring also to FIGURE 2, the matrix is partially enclosed by a regenerator cover 11 which defines a cool air inlet 13 and an exhaust outlet 14. The block 9 defines a hot air outlet 15 opposite the inlet 13 and a hot gas inlet 17. The matrix illustrated in FIGURES 1 and 2 is an annular disk of metallic construction including a hub or inner ring 18 and a body of heat exchange material 19 which may be of any suitable construction such as corrugated metal strips wound to form a disk having parallel faces and pervious to flow parallel to the axis of the disk. The disk also includes an outer ring or rim 21 which may include flanges 22 to cooperate with fixed seals.

The fixed seals, as illustrated in FIGURE 2, comprise a main seal 23 on the outer or inlet and exhaust side and a main seal 24 on the inner or block side of the disk. These seals are indicated only schematically on the drawings, since the details of the seals are not material to the present invention. The seals may be of the nature of those described in U.S. Patent No. 3,386,611. The seal 24 defines two annular portions cooperating respectively with the inner and outer margins of the matrix disk and a cross arm extending radially of the matrix face between the hot air outlet and the hot gas inlet. As illustrated in FIGURE 2, the main seal 23 extends only around the exhaust outlet 14 so that the outer rim 21 of the matrix and the space within the inner ring 18 are exposed to the cool air flowing to the regenerator through inlet 13. The main seals 23 and 24 are of a structure which allows them to float to a limited extent axially of the matrix and to bear lightly against the face of the matrix, notwithstanding distortion of the matrix or case. Any seal structure having such characteristics is satisfactory for use in our invention and, therefore, the details of such a seal will not be described. Reference may be had to the aforementioned U.S. Patent No. 3,368,611 for details of one seal structure which is satisfactory for use in the present combination.

Referring now to FIGURES 3 and 4, we may consider the means for driving and radially locating the matrix 10. A bearing support 26 is fixed over a central opening 27 in the regenerator cover 11, this opening being concentric with the matrix disk. Support 26 mounts a ball bearing 29 and a needle bearing 30 which rotatably support a hollow drive shaft 31 integral with a sprocket 33. A spider or inner coupling member 34 is nonrotatably mounted on the shaft by close-fitting splines 35 and a snap ring 37. As shown more clearly in FIGURE 4, the spider is generally six-sided and provides three equally spaced bosses 38 each of which supports a roller 39 on a shaft 41 which is threaded and is retained by a nut 42. The rollers 39 are needle bearing rollers of a type used as cam followers. They are elements of a universal connection between drive shaft 31 and the matrix. The coupling parts on the matrix include the inner ring 18 previously mentioned and an annular flange 43 which is welded to the ring 18. Six bolts 45 fix a cast hub or outer coupling member 46 to the flange 43. The coupling member 46 defines three axially extending ways or tracks 47 within which the rollers 39 are mounted with very slight clearance so that the rollers can roll or slide axially of the matrix within the tracks to allow the matrix to shift axially of the drive shaft. Slight inclination of the matrix to the drive shaft also is accommodated by relative motion of the three rollers in the tracks. As will be apparent, the bearing of the rollers against the tracks centers the matrix with respect to the shaft and thereby with respect to the seals 23, 24. However, the outer member 46 may expand relative to the inner member 34, the rollers 39 being slidable radially in tracks 47.

The sprocket 33 is driven by a chain 49 which in turn is driven by a drive sprocket (not illustrated) mounted on a shaft 50 which is coupled to any suitable driving means. It may be driven by the gas generator turbine of the engine through reduction gearing so that the matrix is rotated slowly. The sprocket 33 is enclosed within a chain cover 51 which abuts the bearing support 26, appropriate gaskets being put between these two members and between the bearing support and the regenerator cover. The cover 51 is retained by marginal bolts 52 and is reinforced against internal pressure by a socket-headed bolt 53 which extends through the shaft 31 and has an end 54 which threads into the engine block 9. A piston ring seal 55 is disposed between the shaft and the bolt, and another piston ring seal 57 between the shaft and the bearing support. Thermal insulation 58 is disposed over the bearing support 26.

Referring now to FIGURES 5, 6, and 7, these disclose structure which is identical in many respects to that previously described, but in which a ceramic matrix rather than a metal one is used. The coupling between the matrix drive shaft and the matrix has different structure. Also, seals around all the passages to and from the matrix are illustrated. So far as the structure remains identical to that previously described, it is identified by the same reference numerals and no effort will be made to describe it. The ceramic matrix is identified as 70. It includes a porous heat transfer portion 71, a hub 73 fixed by vitreous cement 74 to the main body of the matrix, and a rim 75 including side portions 76 which cooperate with the main seals. Inner side main seal 24 may be the same as previously described, but the outer side seal 77 extends around both the hub and the rim as well as across both arms of the bulkhead or partition between the cool air inlet and the exhaust air outlet.

The matrix drive shaft 31 and the means for supporting and driving it remain the same as previously described. However, the coupling 80 between the shaft and the matrix is of different structure, including an inner coupling member or carrier 81 which is fixedly coupled to the shaft by splines 82 and locked in place by snap rings 83. The carrier 81 includes a bell-shaped body 85 from which three ears 86 project. The coupling 80 includes an outer coupling member 87 which is generally in the form of a ring or collar with three ribs 89 projecting from the coupling member into three equally spaced parallel-walled recesses 90 in the regenerator hub 73. The ribs 89 are disposed intermediate the ears 86 and these are flexibly coupled for joint rotation by a flexible ring 91 of sheet metal which is coupled to the three ears 86 by cap screws 95 and to the outer coupling member by nuts 96 threaded on studs 97 extending from the ends of ribs 89. Ring 91 may be laminated to increase its flexibility, as shown. To distribute the force between the outer coupling member 87 and the hub 73 as uniformly as possible, it is preferred to install pads 98 between the radial faces of the ribs and the radial faces of the recesses 90 in the hub. Pads 98 are of a slightly yielding material such as asbestos gasket sheet or brake lining compound. As will be apparent, the flexible ring 91 can accommodate some misalignment of the regenerator hub with the shaft and can also accommodate some relative axial movement, although this is normally negligible with the ceramic disk. Also, radical slippage can occur between the ribs 89 and the matrix to accommodate relative expansion. The matrix is centered positively in relation to the shaft, however, and is located axially by the seals 24 and 77. In this case, the metal coupling expands more with increases in temperature than the matrix does.

The detailed description of preferred embodiments of the invention for the purpose of explaining the principles thereof is not to be considered as limiting the invention, since many modifications may be made by the exercise of skill in the art.

We claim:
1. A rotary regenerator comprising, in combination,
an annular heat exchange matrix pervious to fluid flow and including a hub having an axis,
stationary structure defining fluid flow paths to and from the matrix and including seals engaging the matrix so as to determine the location of the matrix lengthwise of said axis,
a matrix drive shaft substantially coaxial with said axis,
means rotatably mounting the shaft,
means for driving the shaft,
and a drive connection including a flexible ring coupling the shaft to the matrix hub,
the drive connection including means to center the matrix relative to the drive shaft and thus locate the matrix radially of the shaft, and
the drive connection including means providing for free movement of the matrix axially of the shaft and inclination of the matrix hub axis relative to the shaft axis.

2. A rotary regenerator comprising, in combination,
an annular heat exchange matrix pervious to fluid flow and including a hub having an axis,
stationary structure defining fluid flow paths to and from the matrix and including seals engaging the matrix so as to determine the location of the matrix lengthwise of said axis,
a matrix drive shaft substantially coaxial with said axis,
means rotatably mounting the shaft,
means for driving the shaft,
and a drive connection coupling the shaft to the matrix hub,
in which the drive connection includes a part fixed with respect to the shaft,
a part fixed with respect to the matrix,
rollers on one of said parts,
and means defining tracks for the rollers on the other of said parts,
the drive connection including means to center the matrix relative to the drive shaft and thus locate the matrix radially of the shaft, and
the drive connection including means providing for free movement of the matrix axially of the shaft and inclination of the matrix hub axis relative to the shaft axis.

(References on following page)

References Cited

UNITED STATES PATENTS

| | | | |
|---|---|---|---|
| 3,296,829 | 1/1967 | Williams | 64—15 |
| 2,757,907 | 8/1956 | Williams | 165—9 |
| 3,062,025 | 11/1962 | Bastow et al. | 64—13 |
| 3,072,182 | 1/1963 | Persson | 165—9 |
| 3,187,804 | 6/1965 | Stockman | 165—7 |
| 3,209,813 | 10/1965 | Hryniszak | 165—9 |
| 3,318,108 | 5/1967 | Cadiou | 64—8 |
| 3,364,415 | 1/1968 | Williams | 165—8 X |

ROBERT A. O'LEARY, Primary Examiner

ALBERT W. DAVIS, Assistant Examiner

U.S. Cl. X.R.

64—8, 13, 15, 21

PO-1050
(5/69)

UNITED STATES PATENT OFFICE
CERTIFICATE OF CORRECTION

Patent No. 3,476,173     Dated November 21, 1969

Inventor(s) Joseph W. Bracken, Jr. and William S. Hubble

It is certified that error appears in the above-identified patent and that said Letters Patent are hereby corrected as shown below:

Column 4, line 17, "radical" should read -- radial --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents